United States Patent
Saluja et al.

(10) Patent No.: US 9,230,072 B1
(45) Date of Patent: Jan. 5, 2016

(54) DYNAMIC IDENTITY PROGRAM TEMPLATES

(71) Applicant: Creative Information Technology, Inc., Falls Church, VA (US)

(72) Inventors: Raminder Singh Joginder Singh Saluja, Chantilly, VA (US); Ramakrishna Uppuluri, Potomac, MD (US)

(73) Assignee: Creative Information Technology, Inc., Falls Church, VA (US)

( * ) Notice: Subject to any disclaimer, the term of this patent is extended or adjusted under 35 U.S.C. 154(b) by 0 days.

(21) Appl. No.: 14/109,320

(22) Filed: Dec. 17, 2013

Related U.S. Application Data

(60) Provisional application No. 61/738,040, filed on Dec. 17, 2012.

(51) Int. Cl.
  *G06F 21/30* (2013.01)
(52) U.S. Cl.
  CPC ....................................... *G06F 21/30* (2013.01)
(58) Field of Classification Search
  CPC ....................................................... G06F 21/30
  USPC ............................................................ 726/21
  See application file for complete search history.

(56) References Cited

U.S. PATENT DOCUMENTS

| | | | |
|---|---|---|---|
| 2003/0081785 A1* | 5/2003 | Boneh et al. | 380/277 |
| 2003/0233575 A1* | 12/2003 | Syrjanen et al. | 713/201 |
| 2008/0109883 A1* | 5/2008 | Hernoud et al. | 726/5 |
| 2009/0106558 A1* | 4/2009 | Delgrosso et al. | 713/184 |
| 2009/0177685 A1* | 7/2009 | Ellis et al. | 707/103 R |
| 2009/0204470 A1* | 8/2009 | Weyl et al. | 705/9 |
| 2011/0302640 A1* | 12/2011 | Liu et al. | 726/6 |
| 2013/0097662 A1* | 4/2013 | Pearcy et al. | 726/1 |
| 2013/0226318 A1* | 8/2013 | Procyk et al. | 700/33 |
| 2013/0238356 A1* | 9/2013 | Torii et al. | 705/2 |

\* cited by examiner

*Primary Examiner* — Dao Ho
(74) *Attorney, Agent, or Firm* — Lowenstein Sandler LLP

(57) ABSTRACT

An identity management system is described. The identity management system includes a data store to store a generic template for a user interface (UI) of the identity management system and a dynamic UI toolkit installed at a computing system, the dynamic UI toolkit to create a dynamic identity program template (IPT) from the generic template and customization input. In one example, the identity management system receives a first identifier indicating a first type of identity program; determines a first security level in view of the first identifier, determines a first set of identification elements from a plurality of identification elements in view of the first security level and in view of the first identifier, and generates a first template in view of the first set of identification elements.

11 Claims, 9 Drawing Sheets

DYNAMIC IDENTITY PROGRAM TEMPLATES

RELATED APPLICATIONS

The present application claims the benefit of U.S. Provisional Application Ser. No. 61/738,040, titled "Dynamic Identity Program Templates," filed on Dec. 17, 2012, the entire contents of which are herein incorporated by reference.

BACKGROUND

An identity management system refers to an information system, or to a set of technologies that can be used for enterprise or cross-network identity management. Identity management describes the management of individual identities, their authentication, authorization, roles and privileges within or across system and enterprise boundaries.

Since the attacks on 9/11 and numerous high-profile identity thefts and breaches, federal, state and local governments, as well as private corporations and organizations, have significantly increased spending on identity-related programs worldwide. These programs and initiatives make up a larger marketplace increasingly referred to as "Identity Management and Credentialing" (IdMC).

The IdMC market has now matured to the point where large reference implementations are becoming more commonplace, industry standards are well developed and are being implemented, mandates from government and corporate policy/law makers are stipulating specific process and technical requirements, and convergence models are emerging across the enterprise that includes multi-application and multi-role support.

With these advancements, would-be customers are seeking a reduction in the cost, time and complexity (risk) of implementing IdMC solutions. These IdMC customers are now demanding end-to-end identity solutions that are pre-built and pre-integrated that can be quickly and easily customized to meet their particular needs.

BRIEF DESCRIPTION OF THE DRAWINGS

Embodiments of the present disclosure are illustrated by way of example, and not by way of limitation, and can be more fully understood with reference to the following detailed description when considered in connection with the figures in which.

DETAILED DESCRIPTION

Figure 1:
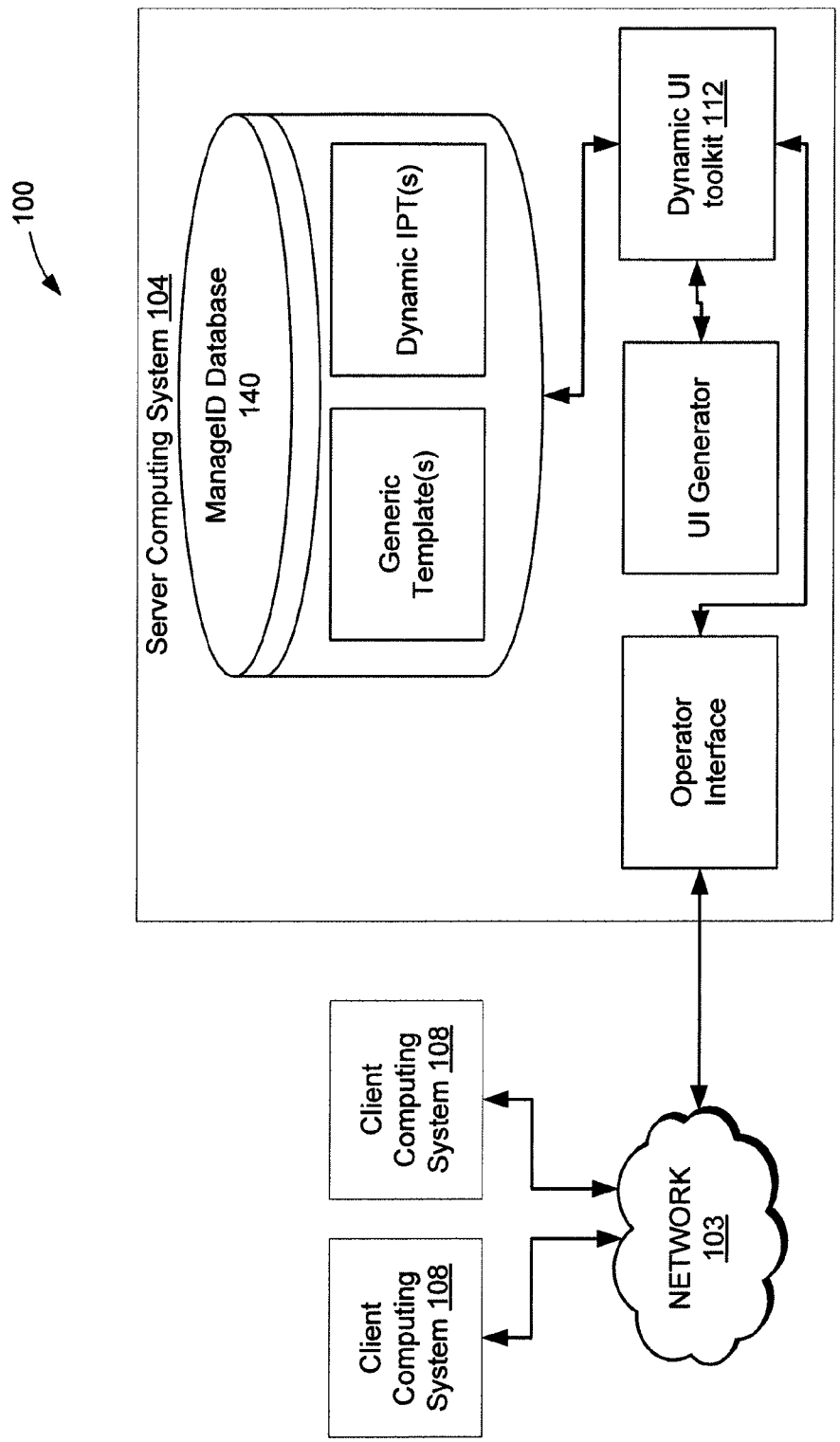
FIG. 1 is a block diagram of an exemplary network architecture in which embodiments of a dynamic user interface (UI) toolkit may operate.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "creating," "recreating," "processing," "providing," "computing," "calculating," "determining," "displaying," "detecting," "sending," "receiving," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a dynamic user interface (UI) toolkit 112 may operate. The network architecture 100 may include a server computing system 104 and multiple client computing systems 108, each connected via a network 103, which may be a private network (e.g., a local area network (LAN), wide area network (WAN), intranet, etc.) or a public network (e.g., the Internet). The client computing system 108 may be one or more machines, including a desktop computer, laptop computer, server, cellular phone, personal digital assistant (PDA), etc. In one embodiment, the client computing system 108 is a server of an enterprise, but is a "client" with respect to the server computing system 104. The client computing system 108 interacts with the server computing system 104 by exchanging messages via standard protocols, e.g., FTP and HTTP.

The server computing system 104 may be one or more machines including one or more server computers, gateways, or other computing systems. The server computing system 104 hosts a database 140 that stores one or more generic templates and, once created, one or more dynamic identity program templates (IPT). The database 140 may be the manageID® system's database, as describe herein. Alternatively, the database 140 may be other types of data stores, which can be one or more centralized data repositories that store the templates as would be appreciated by one of ordinary skill in the art having the benefit of this disclosure. The server computing system 104 executes the dynamic UI toolkit 112. The dynamic UI toolkit 112 may be an application running on top of an operating system of the server computing system 104. The dynamic UI toolkit 112 may also include other helper processes that are executed in a kernel, the user space or both. Alternatively, the dynamic UI toolkit 112 may be integrated into the kernel.

In one embodiment, the dynamic UI toolkit 112 uses a user interface (UI) generator to generate the dynamic IPTs based on the generic templates as described herein. Alternatively, this functionality could be integrated into the templates customizing tool 112.

In one embodiment, the server computing system 104 includes an operator interface, such as a web-based interface that allows the user on the client computing system 108 to communicate with the dynamic UI toolkit 112. In this embodiment, the operator can use a browser application to access the dynamic UI toolkit 112. In another embodiment, the client computing system 108 may also include a command line interface (CLI) or a graphical user interface (GUI) for allowing a user, such as a system administrator, to communicate with the dynamic UI toolkit 112. In this embodiment, the dynamic UI toolkit 112 is executed on the server computing system 104. In other embodiments, the dynamic UI toolkit 112 can be executed in a client application on one of the client computing system 108 as would be appreciated by one of ordinary skill in the art having the benefit of this disclosure. The operations of the dynamic UI toolkit 112 are described in more detail below with respect to FIGS. 2-4.

In one embodiment, the server computing system 104 implements a comprehensive, yet modular, end-to-end, services-oriented IdMC solution, called manageID® system, developed by Creative Information Technology, Inc. (CITI). The manageID® system significantly reduces implementation risk, cost and time over competing solutions. The manageID® solution was developed using the following key principles: The majority of requirements demanded of a particular system (or subsystem) in a given identity application nearly always match or are similar to the set of requirements demanded of that same type of system (or subsystem) in another identity application. For example, a fingerprint identification system used in a passport solution needs to function in a way that is very similar to the way that a fingerprint identification system must function in a national ID solution. Customers desire the ability to implement a minimum amount of required elements immediately and then build a road-map that outlines additional systems and functionality that will be added over time using preferably a minimum amount of assistance from the identity solution provider. For example, a customer may wish to implement a solution that includes the enrollment and storage of the individual's biometric data immediately, and then implement a biometric-capable verification component in the future. Customers need the solution to be modular such that technologies, products and/or system components implemented today can be easily upgraded or replaced by competing or improved technologies, products and components in the future using preferably a minimum amount of assistance from the identity solution provider. For example, a customer may want to implement a fingerprint system from vendor A right away and then switch to a fingerprint system from vendor B five years later. For another example, a customer may implement a low cost PostgreSQL database right away and move to an Oracle database in three years. PostgreSQL is an object-relational database management system (ORDBMS). Customers need the ability to implement technical and process standards natively within the system only when they are cost effective and satisfy specific program goals. Customers always need the native ability to transform data to meet technical standards for external data sharing and exchange purposes. For example, a customer may want to natively implement ANSI/NIST FIPS 201 PIV I process and technical standards within the IdMC system but ignore all or a portion of ANSI/NIST FIPS 201 PIV II/III process and technical standards within the system. However, the customer may need to transform a managed record to a FIPS 201 PIV II technical format for the purposes of data export and agency-to-agency sharing. The manageID® system may include various features, such as manageID® Enroll, manageID® Enterprise Service Array (ESA), as described in "Manage ID™ A modular, End-to-End Enterprise Identity Solution," by Creative Information Technology, Inc of Falls Church, Va.

The manageID® solution has been built using the philosophy of being the one solution for issuing all credentials. Using this concept, the manageID® solution can be configured for issuing various Identity documents/credentials on a SAAS model or on a turnkey customizable solution. Based on various industry standards, the manageID® solution has pre-defined templates (referred to as generic templates) for various identity programs templates. The manageID® solution has templates for passport, voter registration, visa management, or the like, which are pre-configured in the system. These templates can be customized and configured using business processes of the customer using the dynamic UI toolkit 112.

The dynamic UI toolkit 112 allows templates within the manageID® solution to be configured independently for credentials to have its own set of data elements and work flow. The dynamic UI toolkit 112 allows customers to go live with their identity management solution in a comparably lesser time than conventional identity programs take. Biographic and Biometric based identities can co-exist in the same ecosystem using the dynamic UI toolkit 112 and manageID® solution. A high amount of features can be added just through configurations, thus reducing the customization and testing efforts. Multiple identity templates can be issued from the same environment, hence allowing for optimum use of hardware and software components in an ecosystem. The same configuration of the dynamic UI toolkit 112 can be used in client-based application and/or a web-based application. Customers may choose to use a web-based, client-based or combination of both interfaces for capturing information of users or customers.

New identity templates can be added to the existing environment without impacting the current templates; thus providing future expansion capabilities. The dynamic UI toolkit 112 may allow for incremental rollouts for biographic and biometric systems. With a long term goal of having a biometric system, the customer can choose to go live with a biographic system to begin with and then move on to a full-fledged biometric systems in the near future.

The dynamic UI toolkit 112 allows templates within the manageID® solution to be configured independently for credentials to have its own set of data elements and work flow. The dynamic UI toolkit 112 allows a template to be configured across multiple pages. Each page has its own set of data elements with their validation rules. Each template can follow a specific path in a workflow to ensure appropriate data flow. The dynamic UI toolkit 112 allows for dynamic updates of database structure for some components that need enhanced capabilities of data capture. Each identity program has the capability of adding dynamic fields on the screen as well as the database and this feature makes it unique in the industry. The manageID® solution can have multiple identities running at the same time within the same system with custom workflows and life cycle management of each template. This helps in managing multiple documents per person from a single system. For example, a person can have a driver's license and passport both issued from the same application.

The functionality of the dynamic UI toolkit 112 may be achieved through a highly configurable Dynamic UI management and Dynamic workflow management toolkits. Dynamic UI management toolkit is a core component of the manageID® framework that allows customization and configuration of the data elements that are going to be captured on the screen for the credential that is being issued.

Dynamic workflow management toolkit is a core component that allows for configuration and enhancement of workflow management for each identity program template.

The dynamic UI process flow may be spread across the client computing system 108 and the server computing system 104 in that any configuration done on the server computing system 104 is available at the client computer system 108 after synchronization. In one embodiment, the configuration for dynamic UI is stored in the database and every time when the UI is called for and loaded the configuration is fetched from the database to show the UI as previously configured, this provides the functionality and ability to our customers to make changes on the fly without the need to write code to program the functionality. This feature not only saves time and cost of the development process, but may also reduce the time taken for testing the configured process. The customer can choose to make the changes on his own and apply it to the production environment as a future enhancement.

In one embodiment, the dynamic UI toolkit 112 is achieved through a combination of UI tools. UI tools are used in the manageID® solution to manage and configure templates, define the layout of pages, define the fields that are shown to the user, define the help text and error messages, and define how the fields get validated on the screen. For example, the dynamic UI process flow allows the following changes to be made:
1. Add/Delete a new or an existing field
2. Select the data type of the field from Text box, masked, combo box and date fields
3. Configure the validation for the fields
4. Configure the parent child relation between fields
5. Choose between masked or free flowing text for text box
6. Configure mandatory or non-mandatory fields
7. Configure upper and lower limit for date fields
8. Configuration of composite components that can be added to be on to the templates.
9. Encryption of sensitive information stored in the system.

In one embodiment, the dynamic UI process flow enables the operator to configure multiple pages of the same form or setup multiple forms with multiple pages. The dynamic UI process flow may also enable addition of pre- and post-informational, declaration or terms and conditional text to the forms. The dynamic UI process flow may also enable the review page to contain all the dynamic fields for a final review by the person filling it before it is uploaded in the system. The dynamic UI process flow may also provide the ability to add and edit the header for individual screens, as well as modify configurations to modify the tool tips, such as in the form of watermarks for each individual field.

In one embodiment, the dynamic UI process flow has multi-lingual capabilities by being built i-18n standards. Language text to be shown on the screen can be edited on the configuration screens.

Figure 2:
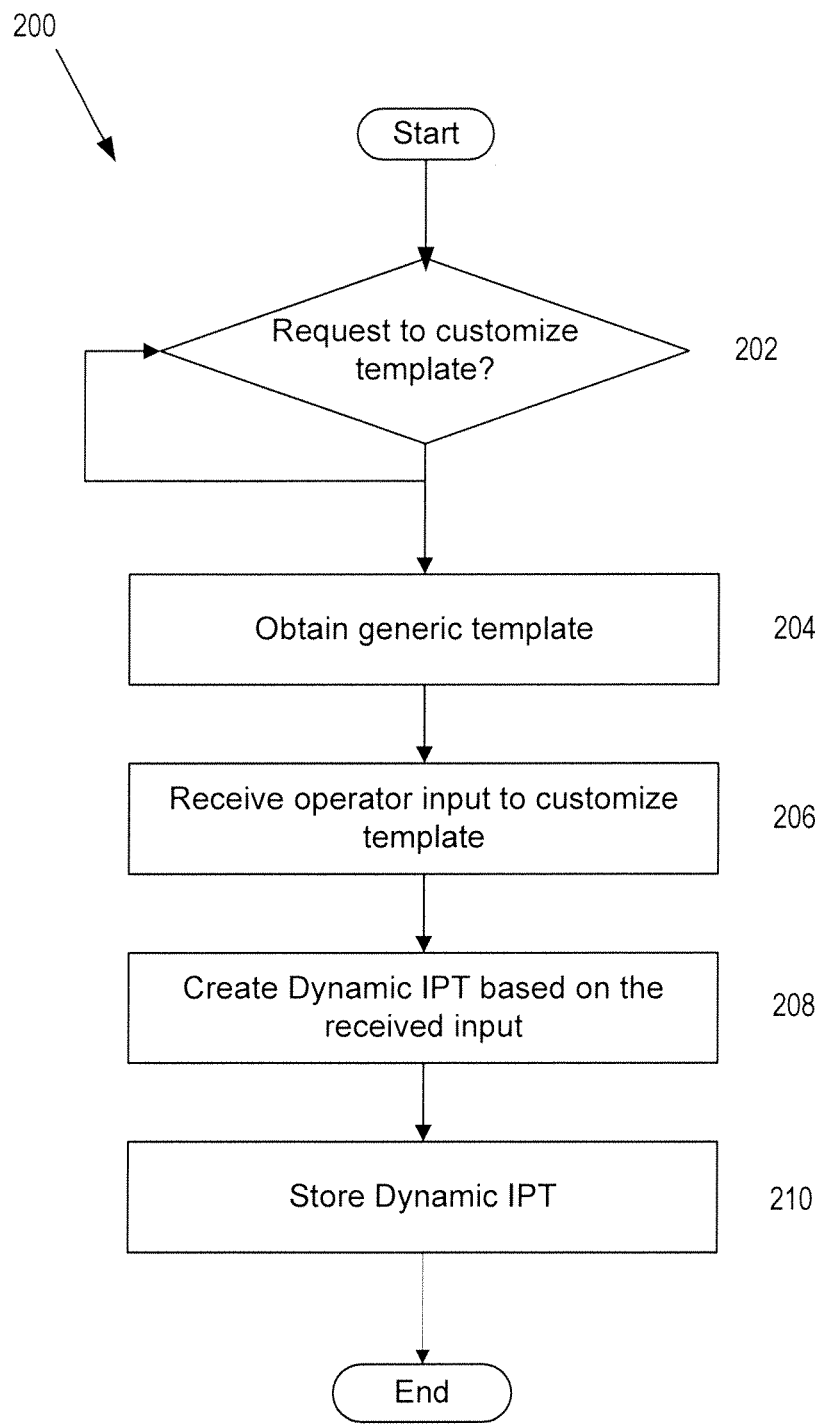
FIG. 2 is a flow diagram illustrating a dynamic UI process flow according to one embodiment.

FIG. 2 is a flow diagram illustrating a dynamic UI process flow 200 according to one embodiment. The process 200 may be performed by processing logic that may comprise hardware (circuitry, dedicated logic, etc.), software (such as is run on a general purpose computing system or a dedicated machine), firmware (embedded software), or any combination thereof. In one embodiment, the dynamic UI process flow 200 is performed by the dynamic UI toolkit 112. In other embodiments, the dynamic UI process flow 200 may be performed by components of the client computing system 108, the server computing system 104 or both.

Referring to FIG. 2, the data sync process begins with determining if a request to customize a generic template is requested by an operator (block 202). Once the request is received, the processing logic obtains generic template from the database (block 204). The processing logic also receives configuration input to customize the template, as described herein (block 206). The processing logic creates a dynamic IPT based on the receipt input (block 208), and stores the dynamic IPT to the database (block 210).

In one embodiment, the processing logic creates the dynamic IPT iteratively as the processing logic receives input. For example, the processing logic may display the user interface being generated so that the operator can change fields, add fields, change order of pages, modify the workflow, or the like. In one embodiment, the processing logic creates the dynamic IPT may include adding or deleting a new or an existing field, selecting the data type of the field from text box, masked combo box and data fields, configuring the validation for the fields, configuring relationships between fields, or any combination thereof. The processing logic can also choose between free flowing text boxes or masked for text boxes, configure mandatory and non-mandatory fields, setting limits for the fields, configuring composite components that can be added to template(s). The processing logic can also be used to configure securing of the UI, such as encryption of sensitive information stored in the system, or the like.

The embodiments of the dynamic UI toolkit 112 provide a combination of functionality that allows UI configuration along with custom business process management. Each template in the system can have its own set of fields along with pre-defined business process that could be configured out of the box. Business processes can be configured for minor changes to the workflow or customized with completely new business processes.

There are no functionalities or applications available in the market today that allow for dynamic UI and pre-configured workflow management to be linked together. The other aspects can be extracted from the explanation of the application provided above.

The embodiments of the dynamic UI toolkit 112 may provide pre-configured templates for various identity types. Dynamic Templates can be used in web-based application, client-based client application or a combination of both.

Figure 3:
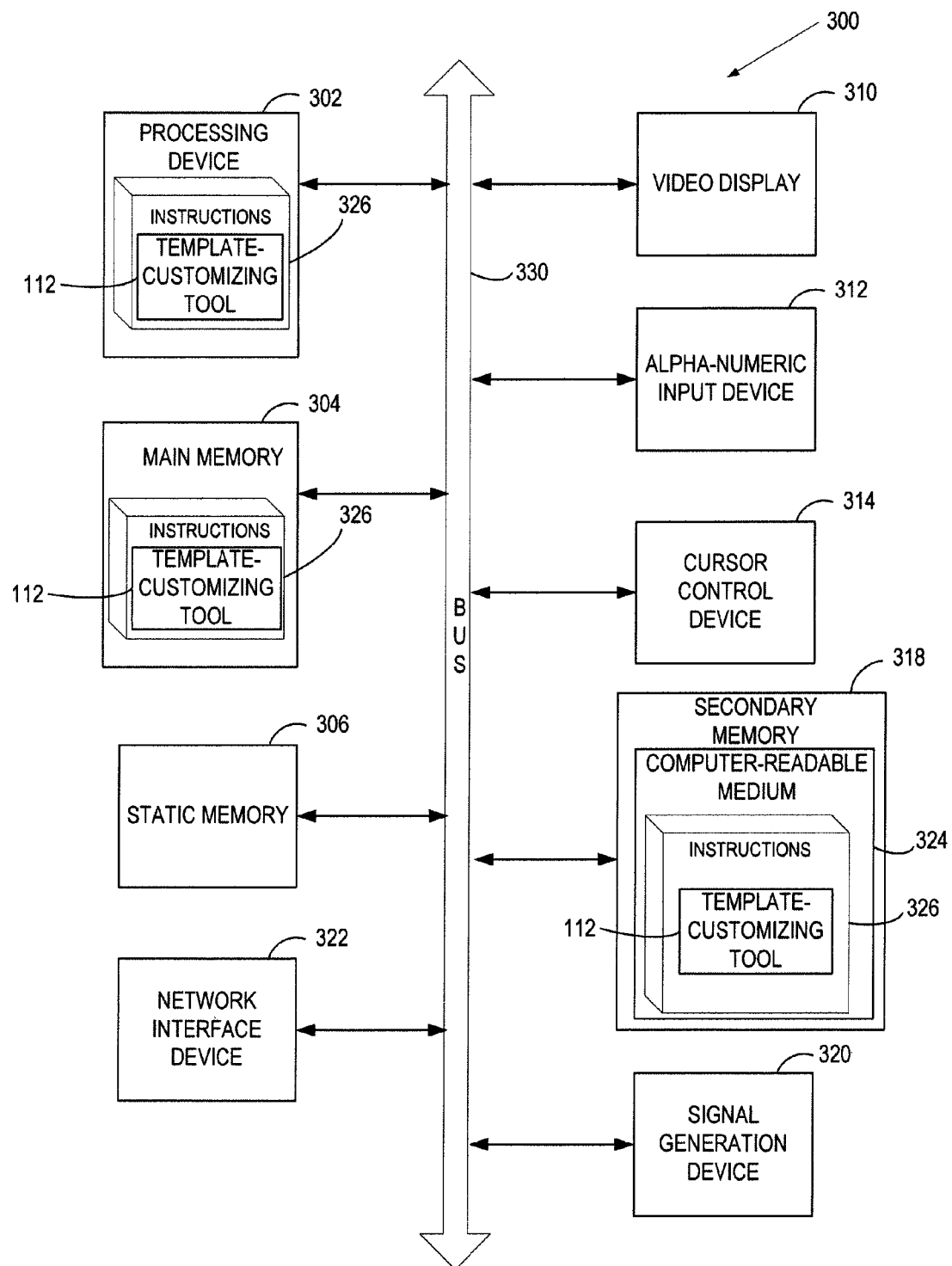
FIG. 3 is a diagram of one embodiment of a computer system for facilitating a dynamic UI toolkit.

FIG. 3 is a diagram of one embodiment of a computer system for facilitating a dynamic UI toolkit 112. Within the computer system 300 is a set of instructions for causing the machine to perform any one or more of the methodologies discussed herein. In alternative embodiments, the machine may be connected (e.g., networked) to other machines in a LAN, an intranet, an extranet, or the Internet. The machine can be a host in a cloud, a cloud provider system, a cloud controller or any other machine. The machine can operate in the capacity of a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or DRAM (RDRAM), etc.), a static memory 306 (e.g., flash memory, static random access memory (SRAM), etc.), and a secondary memory 318 (e.g., a data storage device in the form of a drive unit, which may include fixed or removable computer-readable storage medium), which communicate with each other via a bus 330.

Processing device 302 represents one or more general-purpose processing devices such as a microprocessor, central processing unit, or the like. More particularly, the processing device 302 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. Processing device 302 is configured to execute the instructions 326 for performing the operations of the dynamic UI toolkit 112 and steps discussed herein.

The computer system 300 may further include a network interface device 322. The computer system 300 also may include a video display unit 310 (e.g., a liquid crystal display (LCD) or a cathode ray tube (CRT)) connected to the computer system through a graphics port and graphics chipset, an alphanumeric input device 312 (e.g., a keyboard), a cursor control device 314 (e.g., a mouse), and a signal generation device 320 (e.g., a speaker).

The secondary memory 318 may include a machine-readable storage medium (or more specifically a computer-readable storage medium) 324 on which is stored one or more sets of instructions 326 embodying any one or more of the methodologies or functions described herein. In one embodiment, the instructions 326 include instructions for the dynamic UI toolkit 112. The instructions 326 may also reside, completely or at least partially, within the main memory 304 and/or within the processing device 302 during execution thereof by the computer system 300, the main memory 304 and the processing device 302 also constituting machine-readable storage media.

The computer-readable storage medium 324 may also be used to store the instructions 326 persistently. While the computer-readable storage medium 324 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The instructions 326, components and other features described herein can be implemented as discrete hardware components or integrated in the functionality of hardware components such as ASICs, FPGAs, DSPs or similar devices. In addition, the instructions 326 can be implemented as firmware or functional circuitry within hardware devices. Further, the instructions 326 can be implemented in any combination hardware devices and software components.

Figure 4:
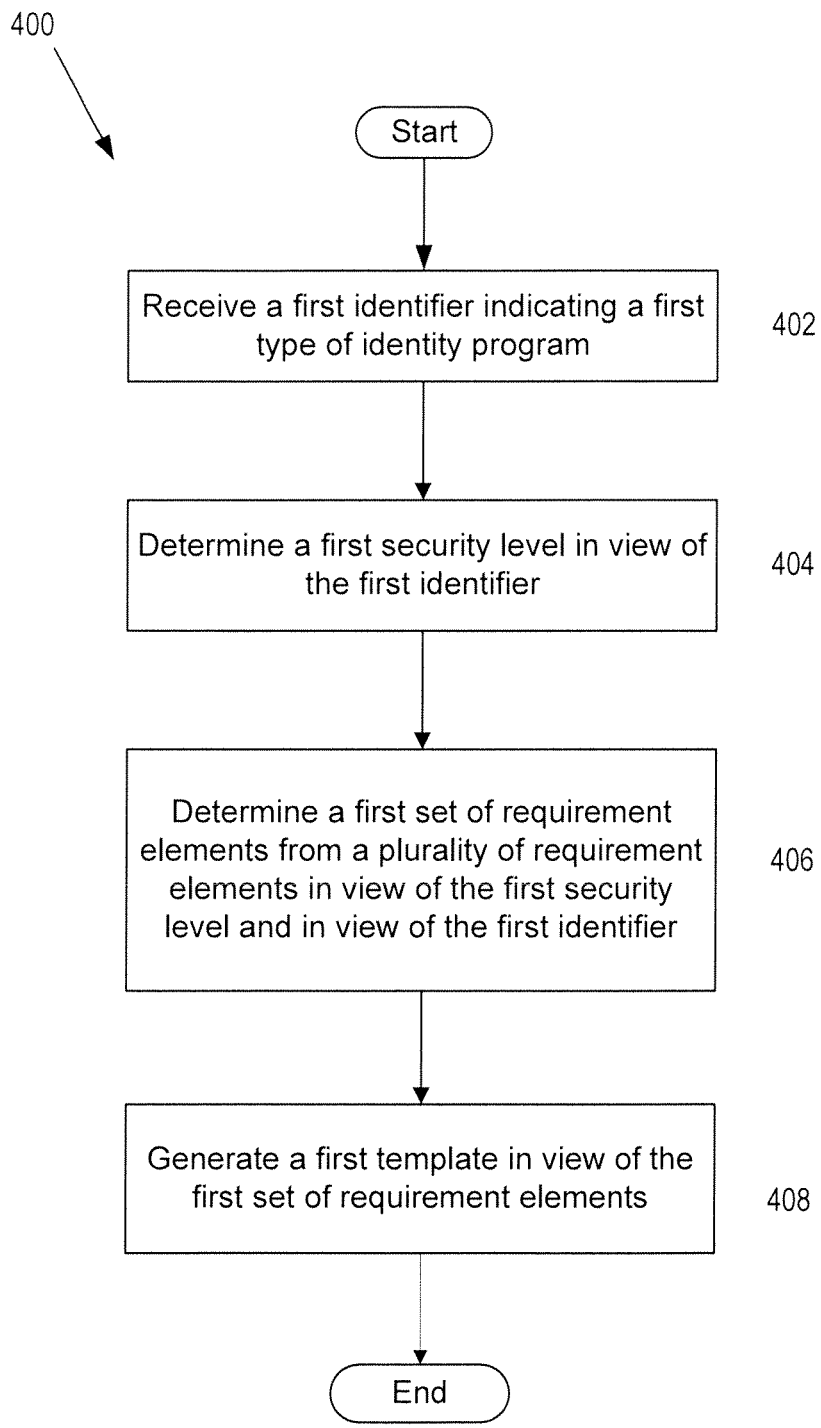
FIG. 4 is a flow diagram illustrating a dynamic UI process flow according to one embodiment.

FIG. 4 is a flow diagram illustrating a dynamic UI process flow 400 according to one embodiment. The process 400 may be performed by processing logic that may comprise hardware (circuitry, dedicated logic, etc.), software (such as is run on a general purpose computing system or a dedicated machine), firmware (embedded software), or any combination thereof. In one embodiment, the dynamic UI process flow 400 is performed by the dynamic UI toolkit 112. In other embodiments, the dynamic UI process flow 400 may be performed by components of the client computing system 108, the server computing system 104 or both.

Referring to FIG. 4, the process begins with receiving, by a processing device, a first identifier indicating a first type of identity program (block 402). Examples of the type of identity program can be, but are not limited to, a visa, a passport, a driver's license, a security access card, or an organization identification card. Once the identity program is received, the processing logic determines a first security level in view of the first type of identity program (block 404). The security level can represent a metric, for example, on a scale from 1 to 10 with 10 being the highest level of security (e.g., passport), 5 being a medium level of security (e.g., a driver's license) and 1 being the lowest level of security (e.g., a public library identification card).

Next, the processing logic determines a first set of identification elements from a plurality of identification elements in view of the first security level and in view of the first identifier (block 406). Examples of identification elements include a person's name, a rank, a date of birth, a social identity number (e.g., a social security number), a telephone number, an address, and the like. In another example, the identification elements can include a person's biometric identifiers such as a finger print, an iris retinal scan, a voice scan, a facial feature, a DNA profile, or an ear print, and the like. In an example, the identification elements can be sent to a third party identity authentication service for validation. The processing logic can then dynamically and automatically generate an identity template in view of the first set of identification elements (block 408).

In an embodiment, the processing logic receives a second identifier indicating a second type of identity program that is different from the first type of identity program as described in block 402. The processing logic can determine a second security level in view of the second identifier, can determine a second set of identification elements from the plurality of identification elements in view of both the second security level and the second identifier, and can generate a second identity template in view of the second set of identification elements.

In an embodiment, the processing logic can determine and associate the types of identity programs with respect to a jurisdiction. As used herein, a jurisdiction refers to a geographic area over which a legal authority extends. For example, the processing logic can distinguish an identity program associated with the United States from an identity program associated with Mexico. In another example, the processing logic can distinguish an identity program associated with the state of New York from an identity program associated with the state of Virginia. The processing logic can then determine a respective security level in view of the identity program associated with a specific jurisdiction.

In an embodiment, the respective jurisdiction can be associated with a language. For example, when the processing logic determines that the jurisdiction associated with the identity program is Mexico, the processing logic can generate the template in Spanish. In another example, when the processing logic determines that the jurisdiction associated with the identity program is the United States, the processing logic can generate the template in English.

In an embodiment, the processing logic can modify a database configuration table for a data store in view of the generated template. For instance, after a template is generated, the processing logic can store the template in a data store for later use. The data store can include a database configuration table, such as a relational database management system, which can be modified in view of the template.

FIGS. 5-9 illustrate exemplary screen shots of the dynamic UI toolkit according to various embodiments. FIGS. 5-9 illustrates how Dynamic UI toolkit could be used to configure the dynamic UI. Dynamic UI Toolkit allows for configuration of how the screens and information that need user inputs will be presented to the user.

Figure 5:
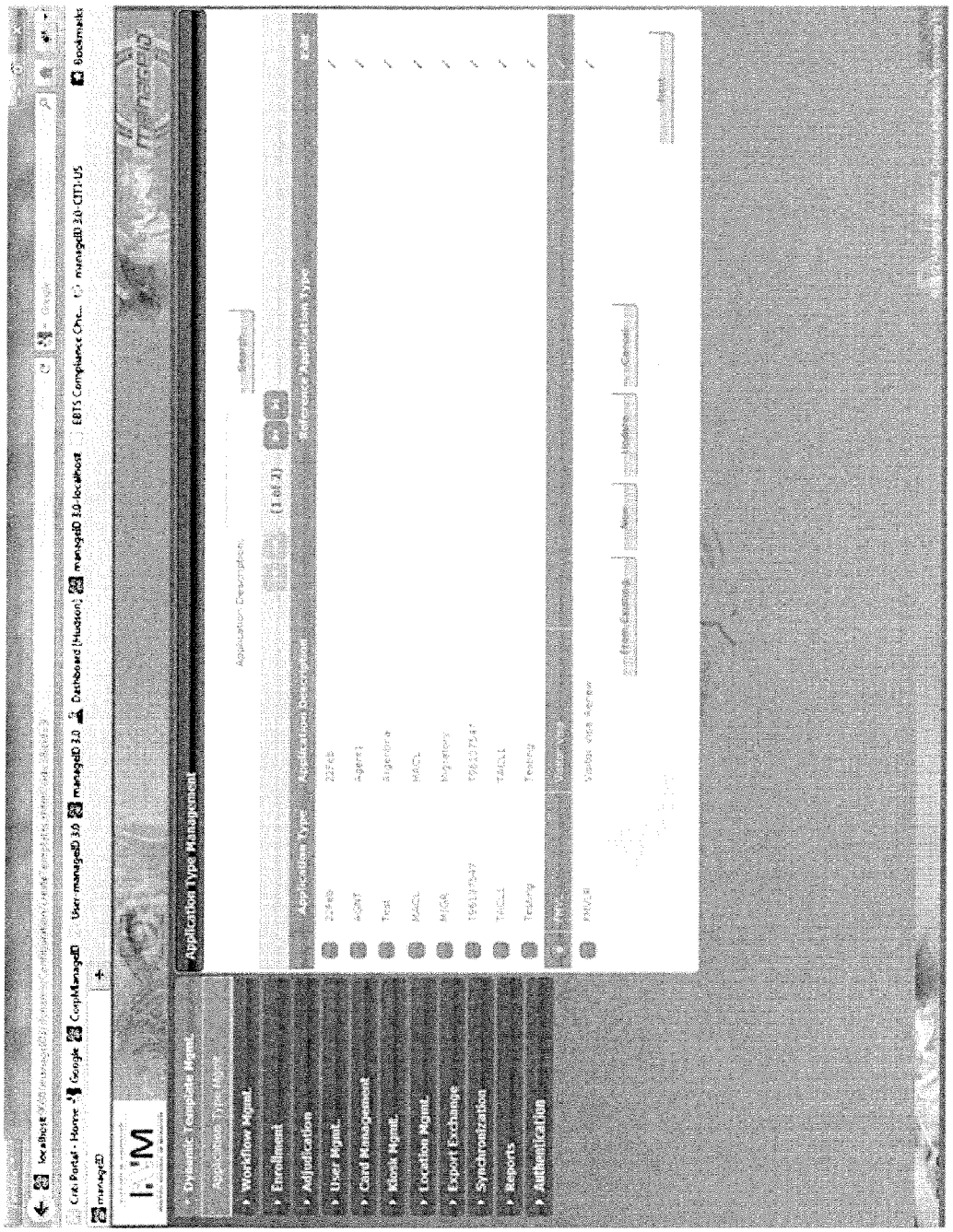
FIGS. 5-9 illustrate exemplary screen shots of the dynamic UI toolkit according to various embodiments.

FIG. 5 shows an example screen shot 500 of an application type, in this example a visitor visa. The application type can be selected from among several different application types.

Figure 6:
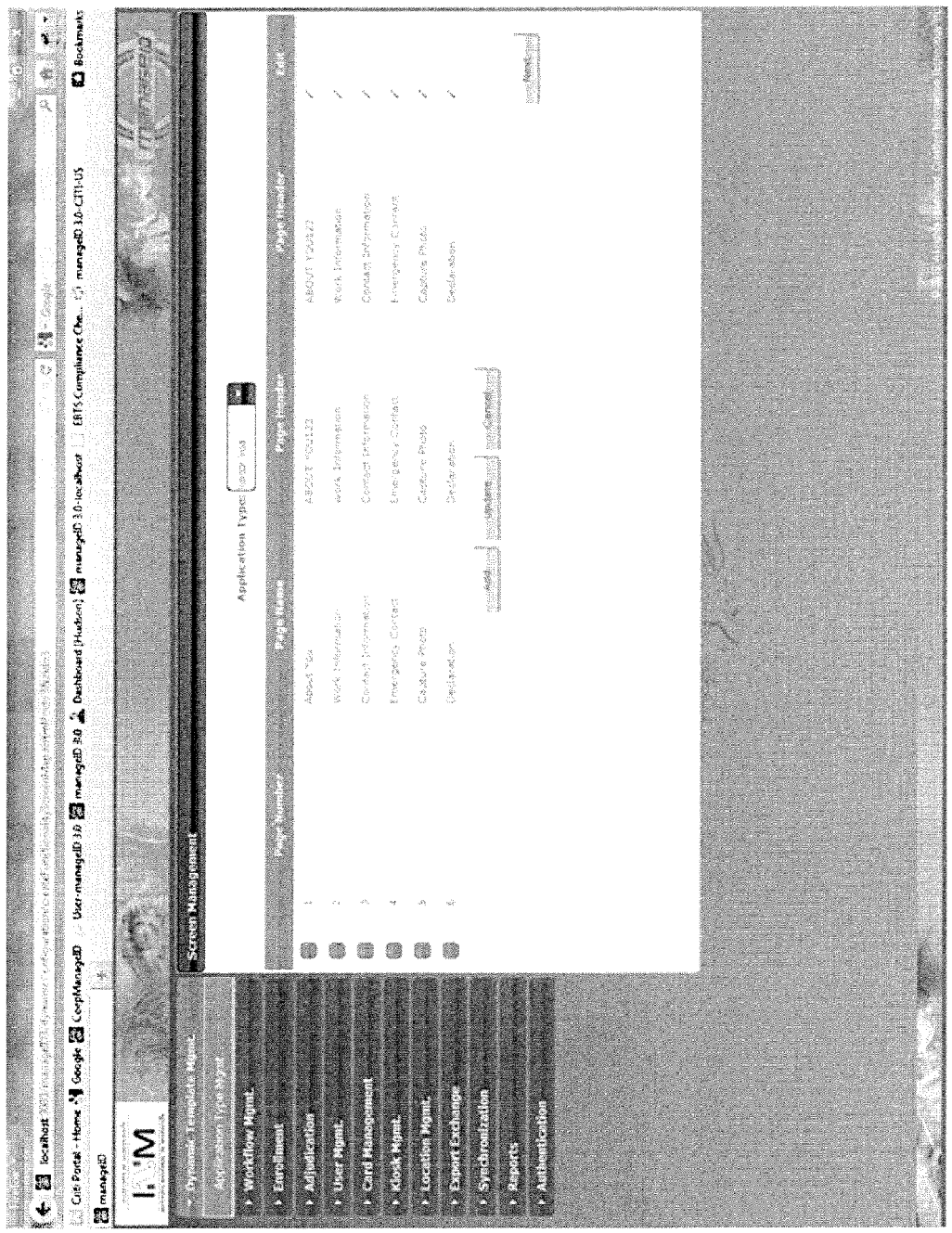

FIG. 6 shows an example screen shot 600 of screen management for the selected application type, in this example a visitor visa. The screen management can present several pages representing additional information relevant to the visitor visa.

Figure 7:
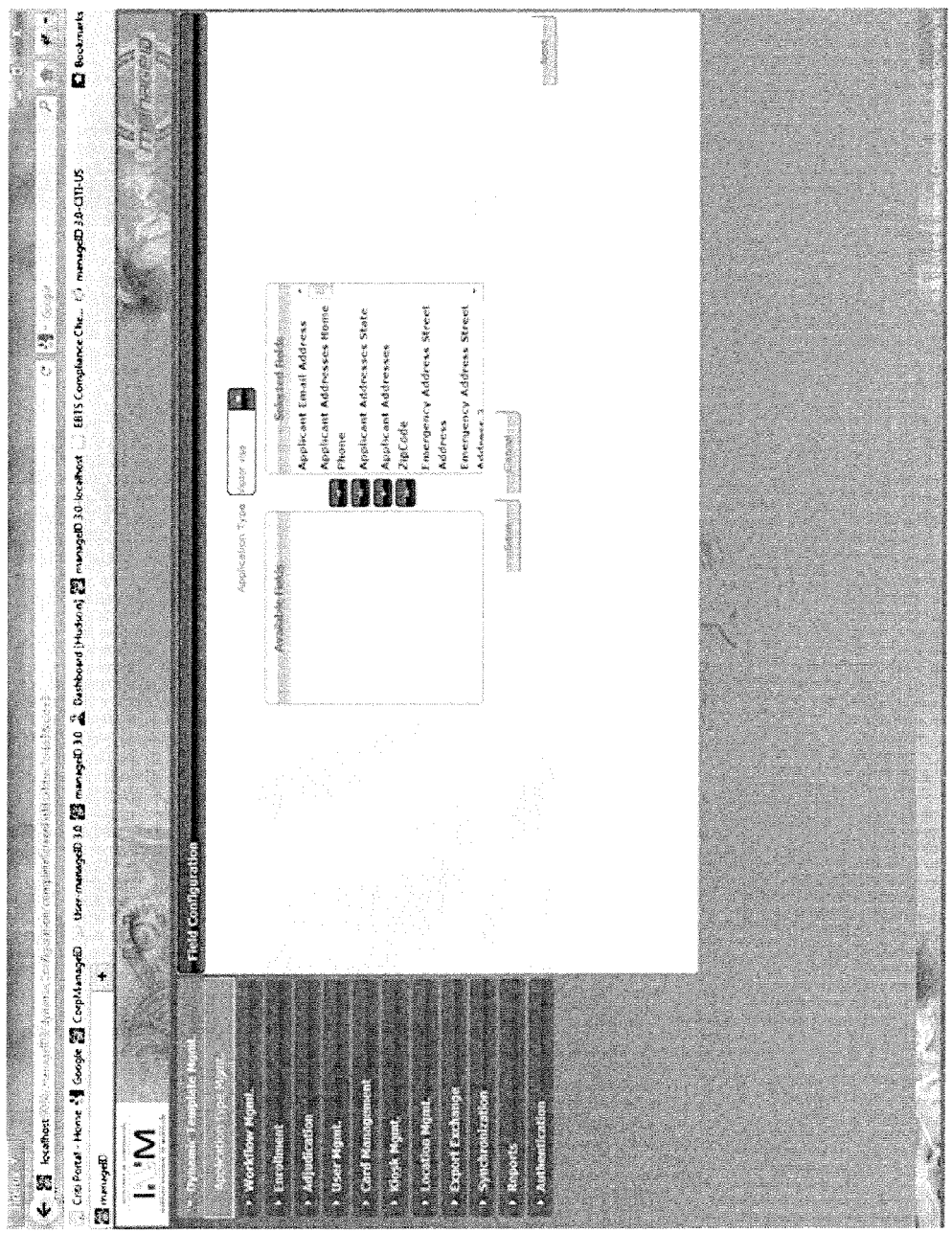

FIG. 7 shows an example screen shot 700 of a field configuration for the selected application type, in this example a visitor visa. The selected fields can include certain contact information related to the person associated with the visitor visa.

Figure 8:
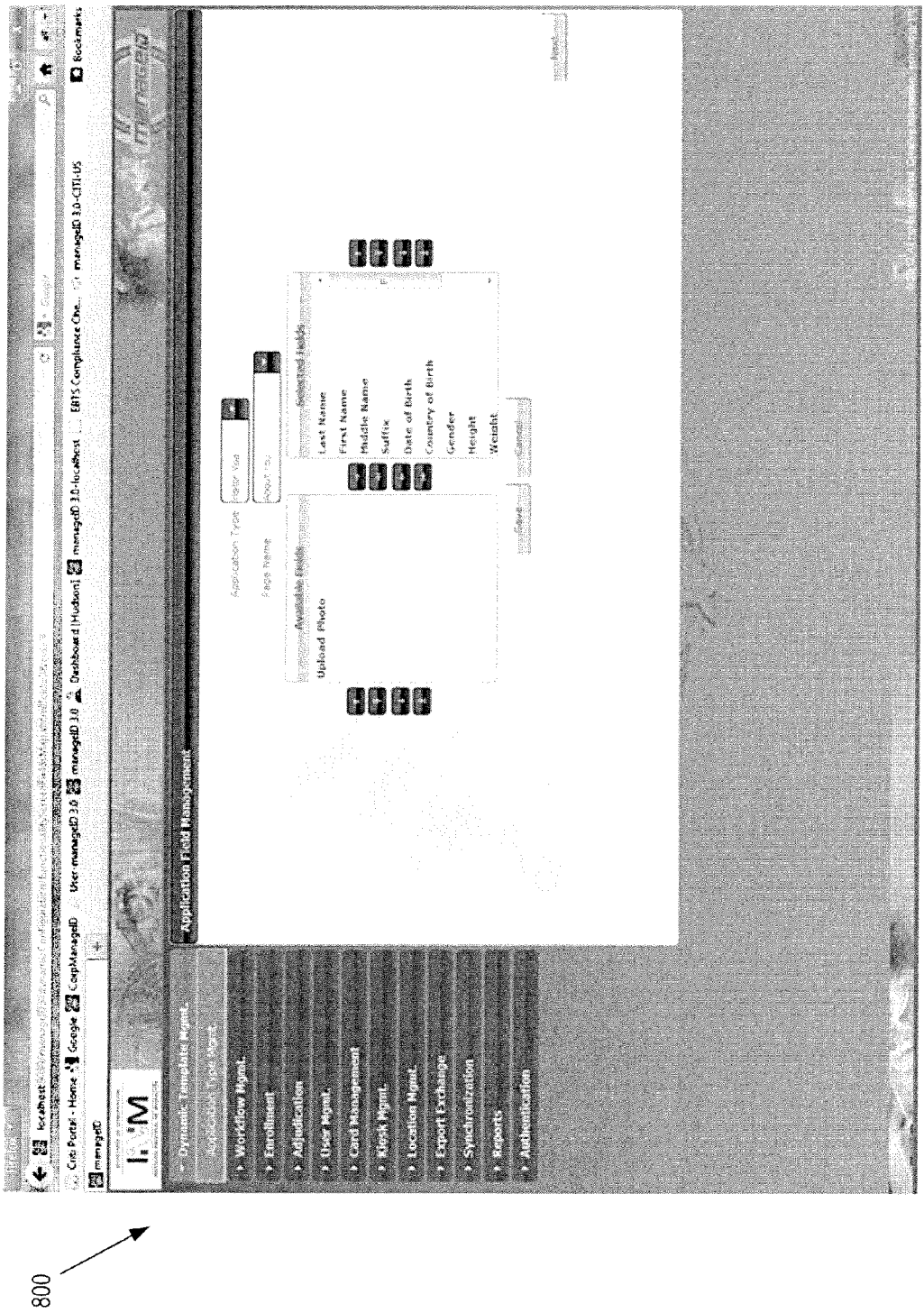

FIG. 8 shows an example screen shot 800 of application field management including available fields and selected fields for a page name associated with the person with respect to the visitor visa. The fields include different types of information associated with the individual, such as the person's name, date of birth, photo, and the like.

Figure 9:
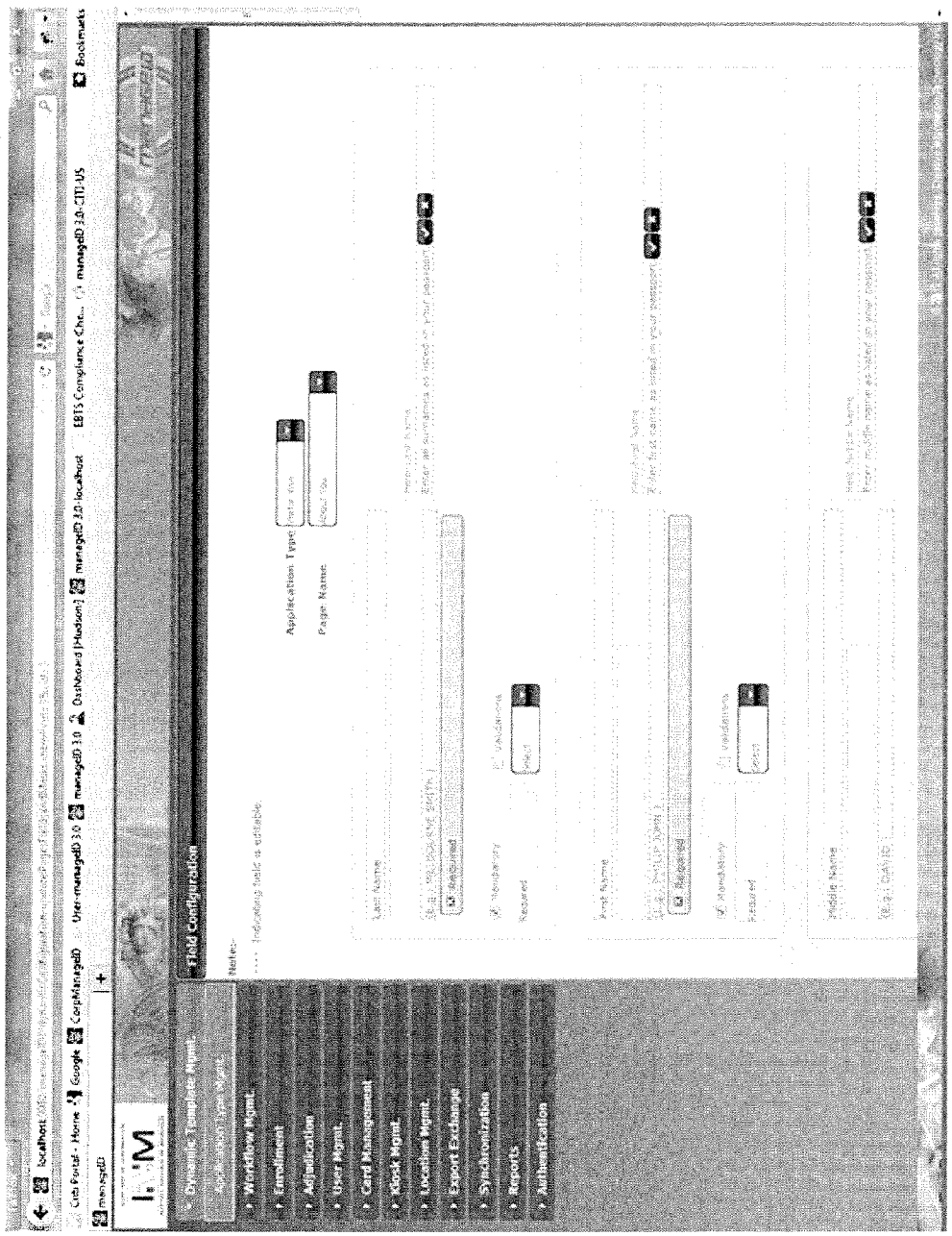

FIG. 9 shows an example screen shot 900 of a field configuration of an identity management system that illustrates editable fields that may be mandatory and may include help suggestions for the user.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    receiving, by a processing device, a first identifier indicating a first type of identity program, wherein the first type of identity program comprises a first tangible identification credential of a user;
    associating the first type of identity program with a first jurisdiction, the first jurisdiction comprising a first geographic area;
    associating the first jurisdiction with a first language;
    determining a first security level of the first type of identity program in view of the first identifier and in view of the first type of identity program associated with the first jurisdiction;
    determining a first set of identification elements from a plurality of identification elements, the first set of identification elements associated with the first security level and the first identifier;
    receiving a selection of a subset of the first set of identification elements relevant to the first type of identity program;
    generating a first template in the first language in view of the subset of the first set of identification elements;
    receiving a second identifier indicating a second type of identity program, wherein the second type of identity program comprises a second tangible identification credential of a user;
    associating the second type of identity program with a second jurisdiction, the second jurisdiction comprising a second geographic region;
    associating the second jurisdiction with a second language;
    determining a second security level in view of the second identifier and in view of the second type of identity program associated with the second jurisdiction;
    determining a second set of identification elements from the plurality of identification elements, the second set of identification elements associated with the second security level and the second identifier;
    receiving a selection of a subset of the second set of identification elements relevant to the second type of identity program; and
    generating a second template in the second language in view of the subset of the second set of identification elements, wherein the first tangible identification credential is associated with the first template and the second tangible identification credential is associated with the second template, and wherein the first tangible identification credential differs from the second tangible identification credential based at least on the first security level being different from the second security level.

2. The method of claim 1, further comprising modifying a database configuration table for a data store in view of the first template.

3. The method of claim 1, wherein the identification elements comprises at least one of a name, a rank, a date of birth, a social identity number, a telephone number, or a validated address.

4. The method of claim 1, wherein the identification elements comprises at least one of a finger print, an iris retinal scan, a voice scan, a facial feature, a DNA profile, or an ear print.

5. The method of claim 1, wherein the tangible identification credential is a visa, a passport, a driver's license, a security access card, or an organization identification card.

6. A system comprising:
   a memory device to store an identity management system; and
   a processing device communicably coupled to the memory device, wherein the processing device is to execute the identity management system to:
      receive a first identifier indicating a first type of identity program, wherein the first type of identity program comprises a first tangible identification credential of a user;
      associate the first type of identity program with a first jurisdiction, the first jurisdiction comprising a first geographic area;
      associate the first jurisdiction with a first language;
      determine a first security level of the first type of identity program in view of the first identifier and in view of the first type of identity program associated with the first jurisdiction;
      determine a first set of identification elements from a plurality of identification elements, the first set of identification elements associated with in view of the first security level and in view of the first identifier;
      receive a selection of a subset of the first set of identification elements relevant to the first type of identity program;
      generate a first template in the first language in view of the subset of the first set of identification elements;
      receive a second identifier indicating a second type of identity program, wherein the second type of identity program comprises a second tangible identification credential of a user;
      associate the second type of identity program with a second jurisdiction, the second jurisdiction comprising a second geographic region;
      associate the second jurisdiction with a second language;
      determine a second security level in view of the second identifier and in view of the second type of identity program associated with the second jurisdiction;
      determine a second set of identification elements from the plurality of identification elements, the second set of identification elements associated with the second security level and the second identifier;
      receive a selection of a subset of the second set of identification elements relevant to the second type of identity program; and
      generate a second template in the second language in view of the subset of the second set of identification elements, wherein the first tangible identification credential is associated with the first template and the second tangible identification credential is associated with the second template, and wherein the first tangible identification credential differs from the second tangible identification credential based at least on the first security level being different from the second security level.

7. The system of claim 6, wherein the identity management system is further to modify a database configuration table for a data store in view of the first template.

8. The system of claim 6, wherein the identification elements comprises at least one of a name, a rank, a date of birth, a social identity number, a telephone number, or a validated address.

9. A non-transitory machine-readable storage medium including instructions that, when accessed by a processing device, cause the processing device to execute operations comprising:
   receiving, by the processing device, a first identifier indicating a first type of identity program, wherein the first type of identity program comprises a first tangible identification credential of a user;
   associating the first type of identity program with a first jurisdiction, the first jurisdiction comprising a first geographic area;
   associating the first jurisdiction with a first language;
   determining a first security level of the first type of identity program in view of the first identifier and in view of the first type of identity program associated with the first jurisdiction;
   determining a first set of identification elements from a plurality of identification elements, the first set of identification elements associated with the first security level and the first identifier;
   receiving a selection of a subset of the first set of identification elements relevant to the first type of identity program;
   generating a first template in the first language in view of the subset of the first set of identification elements;
   receiving a second identifier indicating a second type of identity program, wherein the second type of identity program comprises a second tangible identification credential of a user;
   associating the second type of identity program with a second jurisdiction, the second jurisdiction comprising a second geographic region;
   associating the second jurisdiction with a second language;
   determining a second security level in view of the second identifier and in view of the second type of identity program associated with the second jurisdiction;
   determining a second set of identification elements from the plurality of identification elements, the second set of identification elements associated with the second security level and the second identifier;
   receiving a selection of a subset of the second set of identification elements relevant to the second type of identity program; and
   generating a second template in the second language in view of the subset of the second set of identification elements, wherein the first tangible identification credential is associated with the first template and the second tangible identification credential is associated with the second template, and wherein the first tangible identification credential differs from the second tangible identification credential based at least on the first security level being different from the second security level.

10. The non-transitory machine-readable storage medium of claim 9, wherein the operations further comprise modifying a database configuration table for a data store in view of the first template.

11. The non-transitory machine-readable storage medium of claim 9,
   wherein the identification elements comprises at least one of a name, a rank, a date of birth, a social identity number, a telephone number, or a validated address.

* * * * *